UNITED STATES PATENT OFFICE.

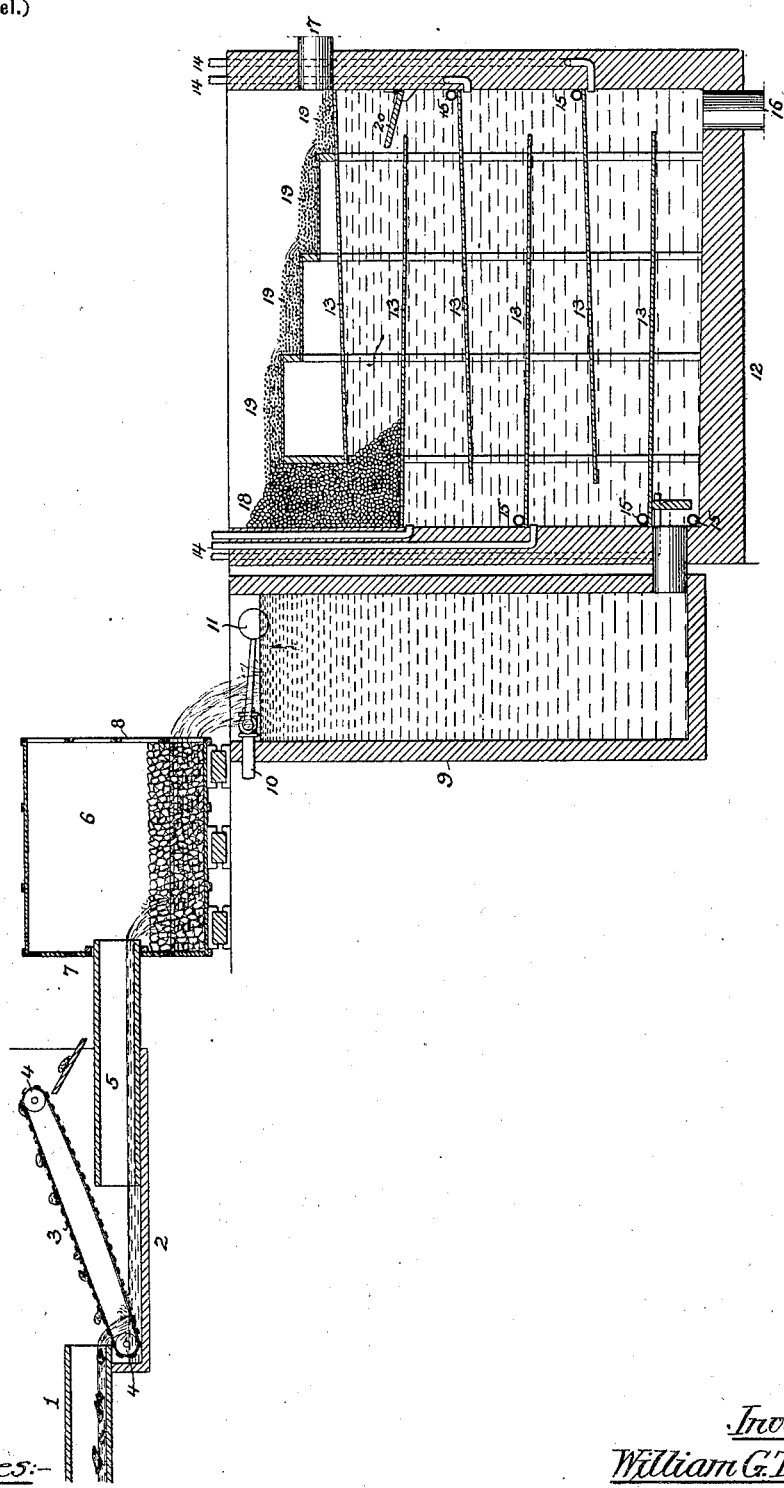

WILLIAM G. TOPLIS, OF PHILADELPHIA, PENNSYLVANIA.

APPARATUS FOR PURIFYING WATER OR SEWAGE.

SPECIFICATION forming part of Letters Patent No. 679,195, dated July 23, 1901.

Application filed March 16, 1901. Serial No. 51,424. (No model.)

*To all whom it may concern:*

Be it known that I, WILLIAM G. TOPLIS, a citizen of the United States, and a resident of Philadelphia, Pennsylvania, have invented certain Improvements in Apparatus for Purifying Water or Sewage, of which the following is a specification.

The object of my invention is to effect the purification of impure water or sewage by a process combining mechanical filtration and biochemical or bacterial action, an object which I attain in the manner hereinafter set forth, reference being had to the accompanying drawing, which represents in longitudinal section apparatus constructed in accordance with my invention for effecting the purification of water and sewage.

The discharge end or outflow of a sewer is represented at 1, this discharge being received in a well or basin 2 after passing first through a suitable screen, whereby all bodies of a size in excess of a certain predetermined limit are removed, the preferable form of such screen being an endless rotating belt 3, composed of slats, or a suitable reticulated structure passing over drums 4, to which movement can be imparted so as to cause a new surface of the screen to be constantly presented to the sewage outflow, the matters caught upon the screen being discharged therefrom when the same passes over the upper drum. From the well or basin 2 the sewage flows through a conduit 5 into a rotating separator 6, consisting of a drum mounted so as to be capable of rotation and caused to rotate in any suitable way, the conduit 5 passing through a central opening in the head 7 of said drum so that it will not interfere with the free rotation of the same. The opposite head 8 of the drum is composed of a suitable grating, preferably formed of metal, set edgewise and separated by suitable filling pieces or thimbles, so as to provide openings of the desired width for the escape of fluid matter from the drum. In the lower portion of the drum is deposited a mass of material—such as broken stone, coarse gravel, metal balls, or the like—which as the drum is rotated will be constantly agitated so as to cause its units to rub or grind against each other. In consequence of this any foreign matters of a size small enough to pass through the screen 3 and which are carried forward with the liquid sewage through the drum are subjected to the grinding or triturating action of the mass of material in the lower portion of the drum, and are thereby reduced to such dimensions that they can be readily carried off with the liquid flowing through the grated end of the drum.

In filtering muddy water the drum may be filled with the granulated material, and when the same becomes clogged the flow from the drum may be diverted while the granular contents of the same are being washed or cleansed by a flow of water through the same while the drum is being rotated, the drum in this case being stationary during the filtering operation.

The drum discharges into a well or cistern 9, into which is also adapted to discharge a pipe 10, communicating with any available supply of water, this water-supply pipe 10 being provided with a valve controlled by a float 11, so that it will be opened as soon as the level of the water in the well or cistern 9 falls below a predetermined height. The well or cistern 9 communicates at the lower end with the lower portion of a sedimenting basin or tank 12, consisting of a suitable casing provided with inclined shelves or baffle-plates 13, suitably supported within the same and each extending from one wall of the tank to a point some distance from the opposite wall; the plates being alternated, so as to provide for a zigzag flow of the liquid through the tank. Owing to the inclination of the shelves or plates 13 an air-space is formed beneath the elevated end of each shelf, and each of these air-spaces communicates with a pipe or passage 14, formed in the wall of the tank and serving either as vent pipes or passages for the gases trapped beneath the shelves or as a means of introducing air into the space beneath each shelf when an oxidizing action upon the material flowing through the tank is desired. Upon each shelf, at the head of the same, is a perforated pipe 15, communicating with a supply of water under pressure and intended to be used for the purpose of flushing the shelves 13 when the sedimental deposits upon the same have accumulated to such an extent as to render such flushing necessary, the flushing-water and the sediment washed from the shelves thereby escaping through the drain 16, which is normally closed.

To prevent the liquid from flowing back from the top chamber of the tank during the flushing operation, and thus causing a backflow through the filter described hereinafter, I locate a trap at the end of said top chamber of the tank, said trap consisting in the present instance of a simple hinged flap 20, adapted to be opened by upward flow of the liquid through the tank, but closing down into the shelf 13 as soon as the upward flow ceases or there is any tendency to backflow.

From the upper compartment of the sedimenting-tank the liquid passes through a filter, and therein receives its final treatment preparatory to its escape in a purified condition from the overflow 17. This filter is composed of a mass of gravel 18, closing the delivery end of the upper compartment of the sedimenting-tank, and a number of masses 19, of sand or other filtering agent, arranged in step-like form, so that the liquid will flow through the same in succession and will be subjected to an aerating action in its passage from one mass to the other. As the flow through these filtering masses is horizontal, the liquid naturally seeks the lowest level, and as the suspended matter is deposited at the bottom of each mass of filtering material the liquid is forced to seek a higher and higher level of said material as its lower portion becomes clogged, so that each filter-bed is practically self-regulating, the liquid to be filtered naturally seeking the cleaner portions of the mass until the entire filtering-bed has become clogged and demands renewal. The same effect might be obtained by disposing the successive bodies of filtering material upon a single horizontal bed with intervening spaces, through which the fluid would be caused to pass and would be therein subjected to the action of the air; but the step form is preferred, because of the agitation or breaking up of the liquid flow in its passage from one bed to another.

It is well known that when sewage is stored in bulk, whether in a closed or open vessel, the dissolved oxygen is rapidly consumed and the septic process of decomposition goes on, the elements entering into the composition of the organic matter being rearranged and new compounds being formed, which compounds are largely of a gaseous and fluid character and are carried forward to the outlet with the water, thereby in great measure removing the sludge. The agent which accomplishes this result is known as "anaerobic" bacteria, these microscopic vegetable organisms having the property of germinating in the absence of oxygen and many of them being incapable of growth when oxygen is present. The products of their growth are compounds readily reducible to simple inorganic compounds when the changes are cut short at the proper time or, in other words, are not allowed to become overripe. These compounds are largely fluid and gaseous and of very disagreeable odor, and if carried to a stage of overripeness the products of metalobism accumulate to such a degree of concentration that they act with toxic effect upon the bacteria utilized in the subsequent operation and prevent the further purification aimed at.

It is essential in order to secure the ideal conditions for the bacterial treatment of sewage that the proper time for the septic stage be accurately fixed and rigidly adhered to, this, together with the regularity of flow upon the beds, being indispensable to successful purification.

The process of nitrification which follows the septic stage of treatment consists in the oxidation of carbon to $CO_2$ and of $NH_4$, formed in the septic process, to $HNO_3$, while the hydrogen and oxygen unite to form water, these effects being brought about by bacteria, to the existence of which oxygen is absolutely necessary, the compounds formed by this decomposition being odorless and free from objectionable features and representing the ultimate end of all dead organic matter.

It will be evident that in a sedimenting-tank, such as that which I have shown and described, provided with means for introducing oxygen into contact with the fluid at any desired stage of its flow the septic conditions can be governed and overripeness prevented, while the frequent aeration of the water during the nitrification process provides the best possible condition for the successful carrying out of that process.

If desired, air may be forced into the filter-beds to further effect the aeration of the liquid in its passage through the filter.

The provision of a separate and controlled water-supply enables me to maintain a regular and uniform flow through the sedimenting-tank at all times, a result which would be impossible when the supply comes from a varying source, such as a sewer, and reaches a maximum at one hour and a minimum probably ninety per cent. less within twenty-four hours thereafter.

To maintain the proper and uniform head necessary for the regular flow of the liquid through the sedimenting-tank, therefore, I employ the supplementary valve-controlled supply which will supplement the deficiencies of the sewage supply and maintain a uniform level in the well or cistern 9 at all times. At the same time the supplementary water-supply will dilute the sewage and reduce the toxic properties of the same so that the nitrifying action forming the final treatment can be most effectively carried on.

Having thus described my invention, I claim and desire to secure by Letters Patent—

1. In apparatus for purifying water or sewage, the combination of an interrupted passage for the liquid, with a rotatable drum interposed between the sections of said passage, and having a grated discharge end, said drum containing a mass of granular material through which the flow is caused to pass, substantially as specified.

2. In apparatus for purifying water or sewage, the combination of an interrupted passage for the liquid, with a rotatable drum interposed between the sections of said passage, and having a grated discharge end, said drum containing a mass of granular material through which the flow is caused to pass and which is kept in agitation by the rotation of the drum so as to exercise a grinding effect upon foreign matters contained in the liquid, substantially as specified.

3. In apparatus for the purification of water or sewage, a sedimenting-tank having inclined plates with pipes or passages communicating with the spaces beneath the heads of said plates so as to withdraw the gases from said spaces or introduce supplies of oxygen into the same, substantially as specified.

4. In apparatus for the purification of water or sewage, the combination of a sedimenting-tank, and a supply well or cistern therefor provided with a valve-controlled water-supply pipe, whereby a controlled supply of water in addition to the normal supply is available for maintaining a uniform flow through the sedimenting-tank, substantially as specified.

5. In apparatus for the purification of sewage or water, a sedimenting-tank having a drainage-outlet, transverse baffle-plates and flush-pipes located at the heads of said baffle-plates, substantially as specified.

6. In apparatus for the purification of water or sewage, a sedimenting-tank having a drainage-outlet, a series of baffle-plates, and an automatic trap in the upper portion of the tank, whereby backflow from the compartment above the trap is prevented, substantially as specified.

In testimony whereof I have signed my name to this specification in the presence of two subscribing witnesses.

WM. G. TOPLIS.

Witnesses:
  H. G. MILLER,
  JOHN J. BRIDGEMAN, Jr.